(12) United States Patent
Dettmer et al.

(10) Patent No.: US 10,039,227 B2
(45) Date of Patent: Aug. 7, 2018

(54) ROOT CROP HARVESTING MACHINE

(71) Applicant: Grimme Landmaschinenfabrik GmbH & Co. KG, Damme (DE)

(72) Inventors: Franz-Josef Dettmer, Ankum (DE); Werner Bellersen, Lohne (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 232 days.

(21) Appl. No.: 14/922,169

(22) Filed: Oct. 25, 2015

(65) Prior Publication Data
US 2016/0113192 A1 Apr. 28, 2016

(30) Foreign Application Priority Data

Oct. 28, 2014 (DE) .................. 10 2014 015 835

(51) Int. Cl.
| | | |
|---|---|---|
| *A01D 17/00* | (2006.01) | |
| *A01D 17/10* | (2006.01) | |
| *A01D 33/08* | (2006.01) | |

(52) U.S. Cl.
CPC ............. *A01D 17/00* (2013.01); *A01D 17/10* (2013.01); *A01D 33/08* (2013.01)

(58) Field of Classification Search
CPC ......... A01D 17/00; A01D 17/10; A01D 33/08
See application file for complete search history.

(56) References Cited

U.S. PATENT DOCUMENTS

| | | |
|---|---|---|
| D945,192 | 1/1910 | Rice |
| 1,461,935 A | 7/1923 | Raasch |
| 1,828,261 A | 10/1931 | Stoltenberg |
| 1,848,781 A | 3/1932 | Hansen |
| 1,960,857 A | 5/1934 | Stoltenberg |

(Continued)

FOREIGN PATENT DOCUMENTS

| | | |
|---|---|---|
| DE | 1 224 079 B | 9/1966 |
| DE | 32 35 087 A1 | 4/1983 |

(Continued)

OTHER PUBLICATIONS

Grimme Landmaschnenfabrik: SF 150/170-60 2-row, self-propelled potato harvester with large bunker (company brochure; English version of brochure cited in the specification on p. 2, 1st full Paragraph); Damme, Germany (2008).

*Primary Examiner* — Jamie L McGowan
(74) *Attorney, Agent, or Firm* — Gudrun E. Huckett

(57) ABSTRACT

A root crop harvesting machine has a crop lifting device that has associated therewith downstream in the conveying direction an ascending first sorting stretch with substantially unchangeable working width. The crop is conveyed across a cleaning stretch to a collecting bunker, wherein a conveying run movable along the ascending sorting stretch is guided to a top drop zone where the conveyed material is transferred onto a downstream conveying stretch. The conveying run in the area of an upper unloading end interacts with at least one deflection conveying unit receiving the conveyed crop stream. This upper deflection conveying unit is provided with at least one separating device that, in working position, is moveable into a position of lateral projecting width so as to project at least on one side past the receiving width of the machine; from this position, it is returnable into a travel position for road travel.

25 Claims, 10 Drawing Sheets

(56) References Cited

U.S. PATENT DOCUMENTS

| | | | |
|---|---|---|---|
| 2,010,335 A | 8/1935 | Stoltenberg | |
| 2,775,438 A | 12/1956 | Bach | |
| 3,198,259 A * | 8/1965 | Manuel | A01D 17/10 |
| | | | 171/116 |
| 3,316,666 A | 5/1967 | Speno | |
| 3,757,867 A * | 9/1973 | Hook | A01D 25/00 |
| | | | 171/58 |
| 4,121,667 A | 10/1978 | Curl | |
| 4,560,008 A | 12/1985 | Carruthers | |
| 4,753,296 A | 6/1988 | Kruithoff | |
| 4,798,248 A * | 1/1989 | Schwitters | A01D 27/00 |
| | | | 171/1 |
| 4,842,076 A * | 6/1989 | Welp | A01D 17/101 |
| | | | 171/124 |
| 5,189,243 A | 2/1993 | Hambric | |
| 5,197,211 A | 3/1993 | Haug | |
| 6,443,234 B1 * | 9/2002 | Raymond | A01D 23/04 |
| | | | 171/31 |
| 7,028,459 B2 | 4/2006 | Lohrentz et al. | |
| 2008/0146300 A1 | 6/2008 | Wallace | |

FOREIGN PATENT DOCUMENTS

| | | |
|---|---|---|
| DE | 36 31 969 | 3/1988 |
| DE | 88 09 672 U1 | 9/1988 |
| DE | 93 20 575.9 U1 | 10/1994 |
| DE | 296 13 018 | 9/1996 |
| DE | 296 19 474 U1 | 4/1997 |
| DE | 10 2007 034 446 A1 | 1/2009 |
| EP | 0 359 904 A1 | 3/1990 |
| EP | 1 405 554 A1 | 4/2004 |
| FR | 2 440 144 A1 | 5/1980 |
| GB | 574 777 | 1/1946 |
| JP | H08 256 552 A | 10/1996 |
| RU | 2479981 C2 | 2/2013 |

* cited by examiner

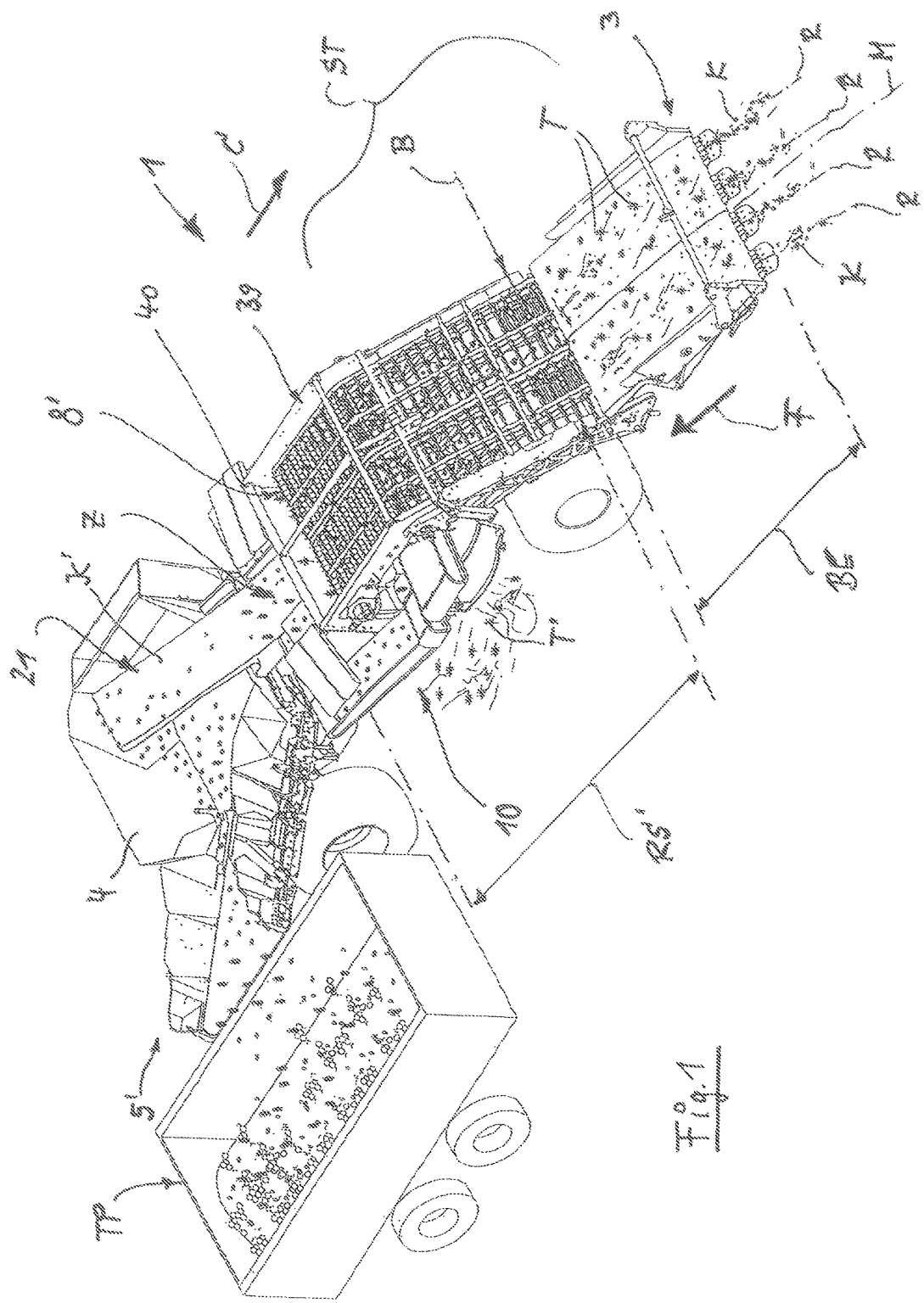

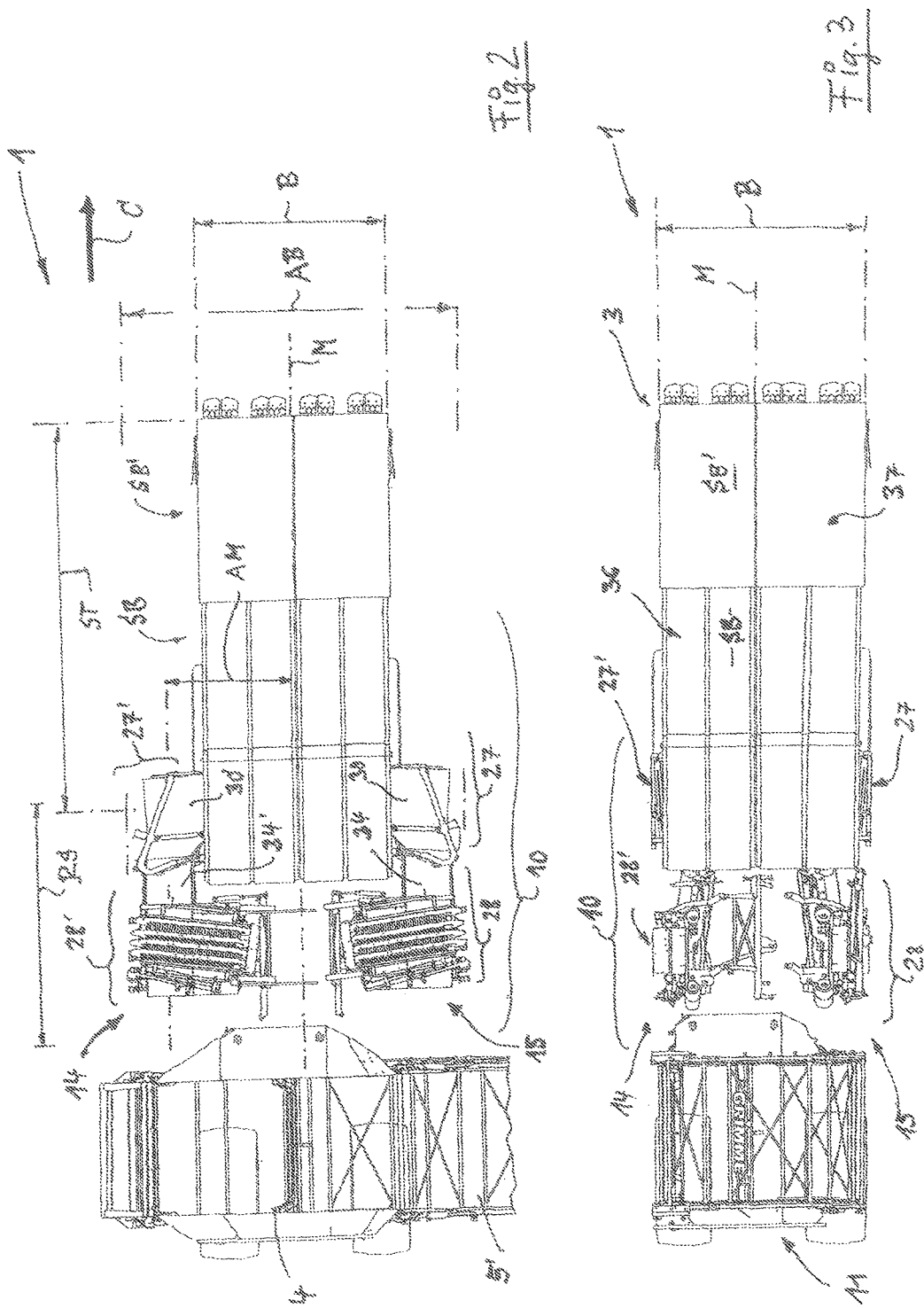

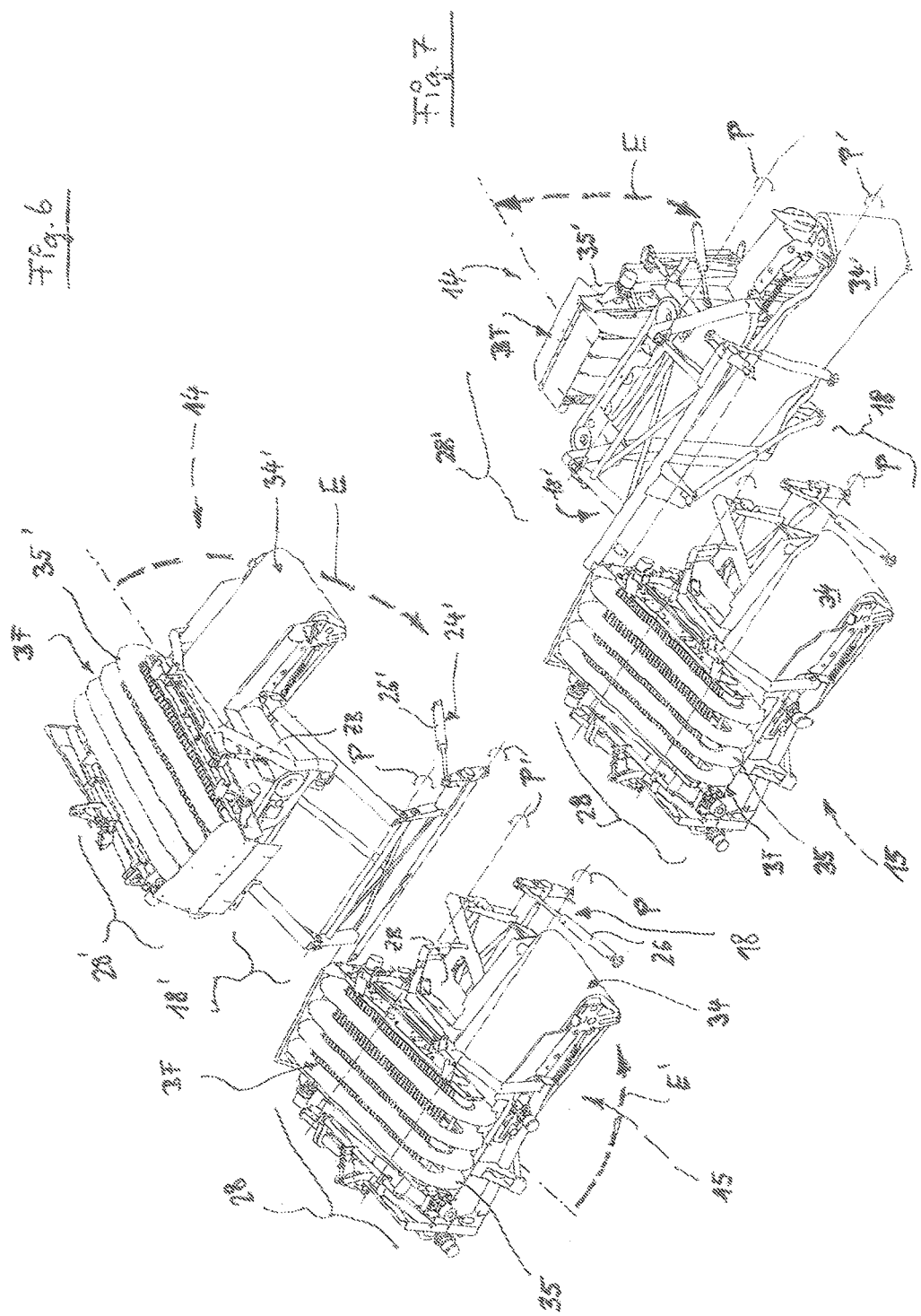

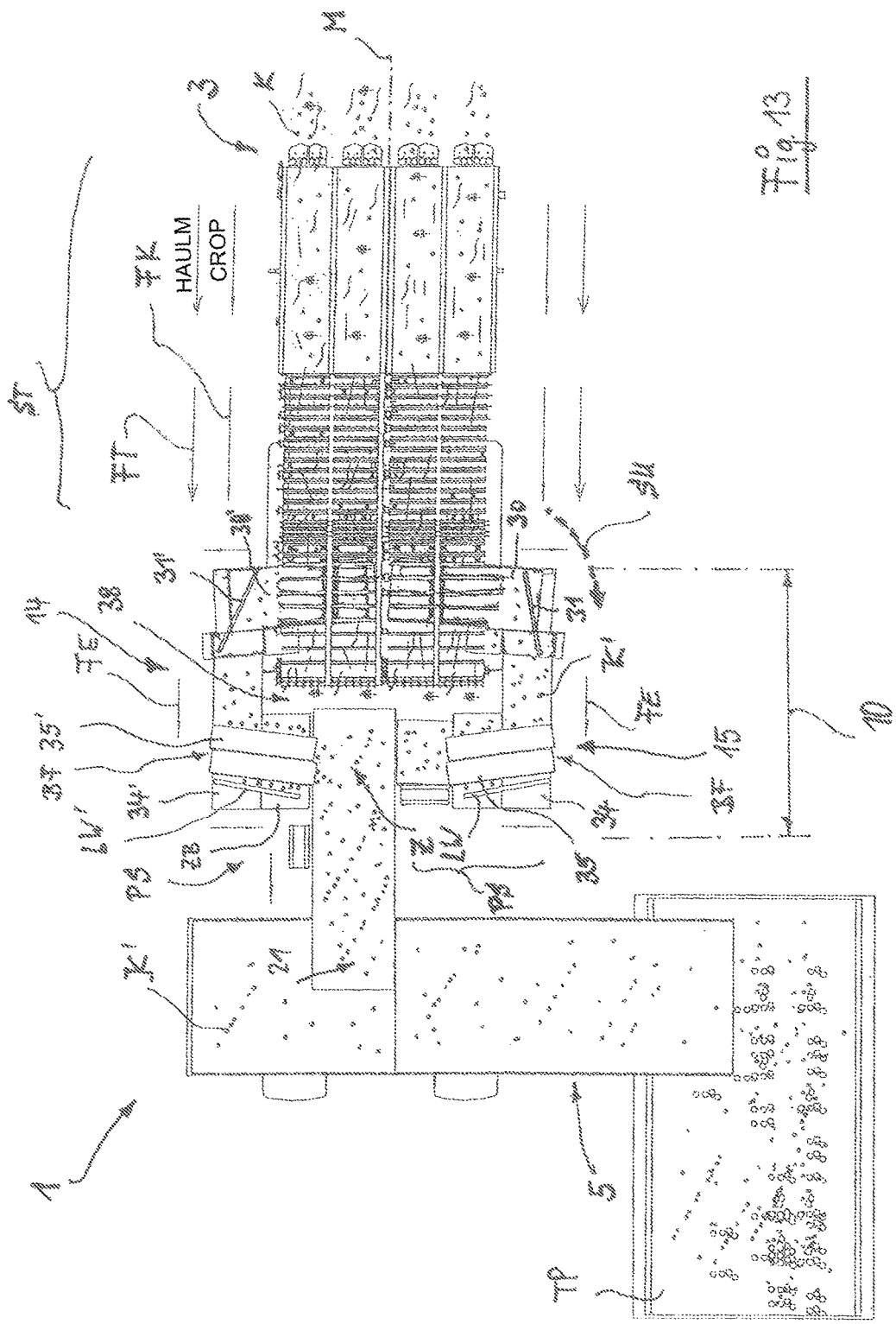

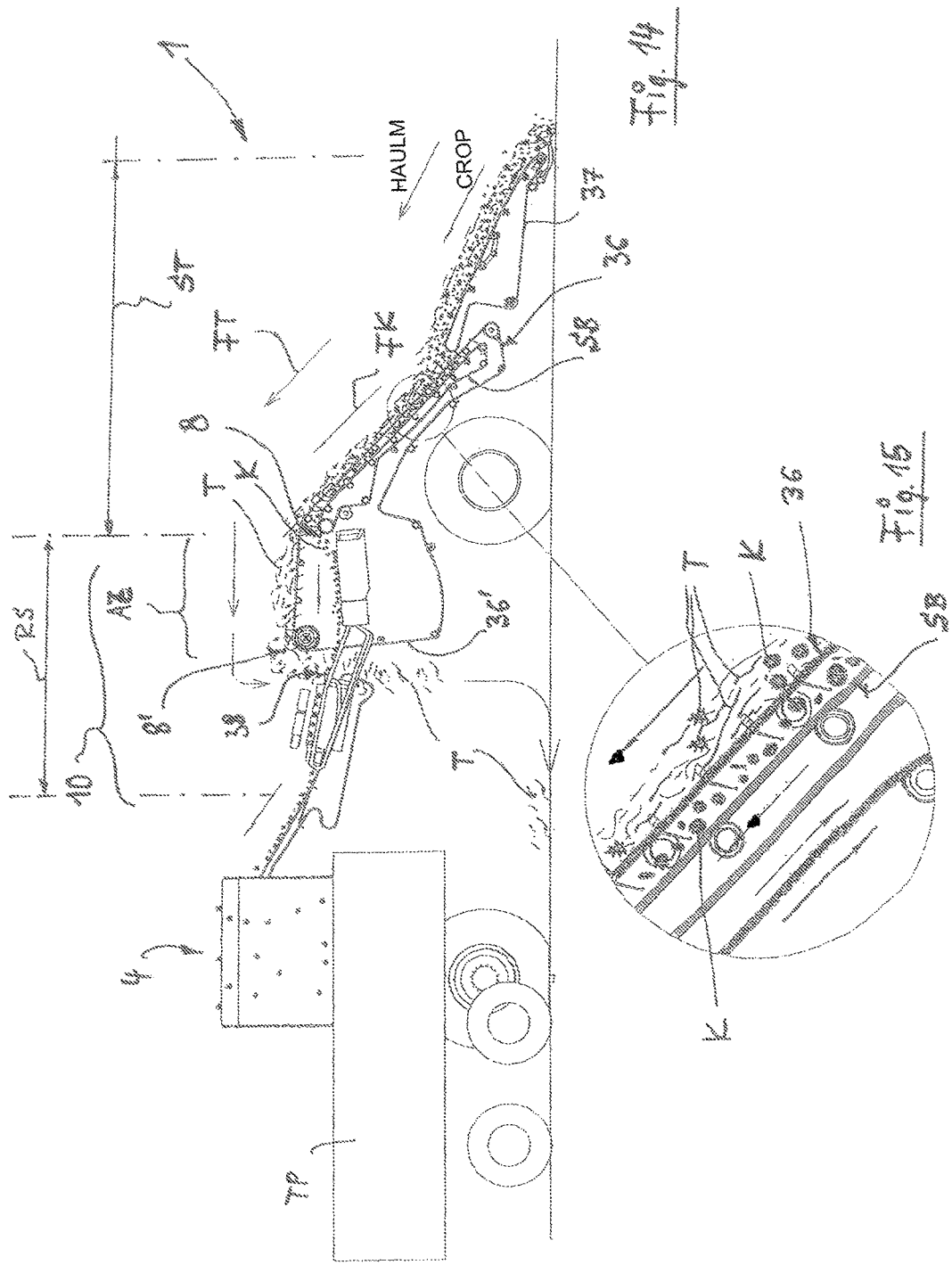

ROOT CROP HARVESTING MACHINE

BACKGROUND OF THE INVENTION

The invention concerns a machine for harvesting root crop, in particular in the form of a complete potato harvesting machine embodied as a self-propelled potato harvester or a stationary cleaning machine. Such a machine comprises a lifting device in the forward area of a machine frame, wherein downstream thereof in the conveying direction an ascending first sorting stretch is associated therewith that comprises a substantially unchangeable working width. With the sorting stretch, the admixtures can be sorted out in such a way that the crop in the form of root crop such as beets, potatoes or the like can be conveyed as a respective conveyed material across at least one cleaning stretch to a collecting bunker or an unloading elevator, wherein at least one conveying run movable along the sectionwise ascending sorting stretch is guided at least to a top drop zone and subsequently the respective conveyed material can be transferred onto at least one downstream conveying stretch.

Machines for harvesting and processing root crop, in particular potatoes, have been known for a long time in various embodiments of pull-behind devices or self-propelled machines. In such machine configurations, lifting devices that lift several rows of crop with admixtures from the soil of the field are used in connection with a downstream conveying and cleaning system. DE 32 35 087C2 discloses such a construction in connection with a root crop harvesting machine that is pulled by a tractor.

In a potato harvesting machine according to DE 93 20 575.9 U1, a screen conveyor with which the crop and the admixtures are supplied to the next cleaning stage is provided downstream of a lifting device that is provided with lifting shares.

A more complex configuration of a pulled potato harvesting machine according to DE 10 2007 034 44 6 A1 comprises also downstream of a lifting device the first longitudinal conveying device which is effective in combination with a second screen belt stage secured in the same frame construction is effective. In this context, downstream of a transfer zone provided with a belt overlap, an upward conveying of the mixture is provided. In this context, all of the conveying and cleaning component groups are secured on a substantially closed frame construction of the machine so that a linear movement to an upper deflection and sorting section is realized.

A similar construction is provided for a self-propelled complete potato harvesting machine (brochure "SF 150/170-60" of the company Grimme Landmaschinenfabrik GmbH & Co. KG, Damme, Germany, publication number L05.0851.DE04/08/2000; 2008) wherein a first cleaning unit that receives the crop and is provided with receiving belt and a first screen belt and a second cleaning unit with a second screen belt are arranged in linear sequence behind each other as conveying component groups.

In the technical further development of such harvesting machines for root crop, for improving the cleaning and sorting conditions, respective components of the conveying complex that are arranged downstream of the leading receiving and cleaning system or respective belt component groups that are provided for manual sorting, for example, in the area of transfer conveyor belts, are replaced with larger component groups that, in relation to the machine frame, may cause a lateral projection. This affects at the same time handling of the system that is to be steered along the contour of the field because performing a complete lifting process in particular near the respective edge zones of the field, may be affected by projecting components of the machine and crop loss can thus occur. In the aforementioned concept of the self-propelled complete potato harvesting machines according to the aforementioned brochure "SF 150/170-60", the steering and drive unit is arranged upstream of the pickup system for the crop so that the corresponding length of the machine is considerable.

The object of the invention is to provide a machine for harvesting root crop, in particular in the form of a complete potato harvesting machine, which, with minimal technical expenditure, can also be used as a compact unit for more than two crop ridges, which with an optimizable lifting process enables an increase of the harvesting performance, and which in the area of the conveying and distribution component groups comprises an operating structure that is adjustable with regard to a travel width for traveling on roads.

SUMMARY OF THE INVENTION

The invention solves this object with a machine of the aforementioned kind, wherein the respective conveying run in the area of an upper unloading end interacts with at least one deflection conveying unit receiving the conveyed material stream of the crop, the at least one deflection conveying unit forming at least one partial conveyed stream that is substantially movable transverse to the feed direction of the respective conveying run and can be fed into the area of at least one unloading conveyor, wherein the upper deflection conveying unit of the system is provided with at least one separating device that, in working position, is moveable into a position of lateral projecting width as to project at least on one side past the receiving width of the machine as well as, from this position, is returnable into a travel position usable for traveling on roads.

Important further embodiments can be taken from the dependent claims.

Root crop harvesting machines are known in the form of pull-behind or self-propelled potato harvesters but also as stationary cleaning machines. The machines useable on the harvest field have in the leading area of their machine frame a lifting device by means of which the crop can be moved by conveying devices along a sorting stretch into a collecting bunker or an unloading elevator. In this connection, in particular conveying runs that are moveable on ascending belt component groups are utilized for overcoming different conveying and sorting stretches provided with the required distribution length.

In the improved concept according to the invention of such a machine, it is provided that its conveying run, beginning in the first receiving area near the lifting process and forming an ascending sorting stretch, can be oriented in the area of its upper unloading stretch such that the at least one conveyed material stream is guided onto a deflection conveying unit integrated into the machine structure with respective moveable belt sections that can be used in various positions.

This deflection conveying unit which is provided as a compact basic component group of the new machine concept is designed such that at least one partial conveyed stream can be formed with it substantially transverse to the feed direction. Based on this partial conveyed stream, the crop which is supplied in the area of the first conveying run is moved with generally known conveying elements and is fed to the area of at least one downstream unloading device.

Accordingly, in the area of the upper deflection conveying unit an optimizable device system is provided with which variable configurations of generally known separating and/or sorting devices are combined for a controlled deflection sorting processing within a tight space. This functional unit is advantageously designed such that, in its field working position, respective component groups can project, at least on one side, past a receiving width of the machine which determines the travel width of the machine. The deflection conveying device is designed such that laterally projecting component groups are supported such that they can be returned from this position into a travel position required for traveling on roads.

It has been found that in particular for potato harvesters of self-propelled configuration that defines a conceivable maximum receiving width, here corresponding to a travel width of 3 m, the concept with the "moveable" deflection conveying unit can be optimally integrated into the machine frame. In this context, by effectively adjustable guides in the area of a coarse haulm belt and of a crop belt downstream of the lifting process, a further transfer of the conveyed material on a sorting stretch that requires only minimal space can be defined such that, for an overall reducible machine length, a quality separation of admixtures from the crop is possible.

The mandatorily required "belt lengths" for loosening and sorting crop are adjusted in the area of the "multi-track" deflection conveying unit to a conveying volume that is increasing in accordance with the enlarged receiving width. These conveying component groups can be variably designed in particular in such a way that the separating devices of the deflection conveying unit which are extendable into a respective working position can occupy a lateral free space adjacent to the machine. After this field use with extended position, a controllable "automatic" return movement is provided for subsequent travel on roads. In this context, the moveable components are moved into a compact position of non-use that in particular does not surpass the 3 m travel width (with special permit 3.30 m travel width) and can be secured in the area of the machine frame for safe travel. Conceivable is also that the adjustable deflection conveying unit is combined with a lifting device with movable lifting components which, in turn, can project past the 3 m travel width while working in the field, wherein subsequently these lifting components are then returned to "standard size".

It is understood that the lifting device which is upstream of the cleaning and sorting stretch can be designed preferably with a receiving width that corresponds substantially to the travel width of the machine. The combination of the downstream components in the area of the deflection conveying unit provides that, based on already known four-row machines, a construction with "outwardly positioned separating devices" can be constructed.

In this context, a first conveying stretch of a comparatively simple design with ascending conveying run is joined in the area of the two separating devices with the deflection conveying unit forming preferably two partial streams. In this way, it is achieved that the conveyed material in the form of root crop, that has been pre-cleaned on the sorting stretch and is supplied in a wide swath by means of at least one screen belt, is optimally distributed in the area of the deflection conveying unit onto the two separating devices each forming a partial stream. Accordingly, even for large-volume conveyed streams a maximum conveying, cleaning, and throughput performance of the system is ensured.

It has been found that the deflection conveying unit according to the invention enables an optimal separation of the two partial streams of the crop, the crop being moved optimally on the respective partial conveying stretches to the post sorting operation, and the crop, free from admixtures, can be collected or combined downstream of the two partial conveying stretches for unloading.

In this context, the deflection conveying unit in the area of the upstream ascending conveying stretch is advantageously combined with a two-belt system separating crop and admixtures. With this "double-layer" conveying action, in a comparatively tight space, even respective admixtures that have reached an upper drop zone can be optimally discharged from the sorting system. The belt guiding action is designed in this context such that the deflection conveying unit can be "bypassed" with minimal expenditure and mutual influences of the conveying stretches are avoided in this way.

The constructively adaptable configuration of in particular the two separating devices of the deflection conveying unit provides that, in the area of the crop transfer, the two separating devices form substantially oppositely and outwardly oriented partial conveying stretches relative to the longitudinal machine center plane. It is also conceivable that conveying stretches are provided that are slanted at an acute angle. In particular, the system provides that, beginning with the outwardly oriented partial conveying stretches, subsequently at least sectionwise a parallel conveying action of the crop to the rearward area of the machine is realized and in these conveying phases further contaminants can be removed from the crop streams and the latter are then combined in an area upstream of a collecting bunker or the like.

The constructively variably designed separating devices are configured such that at least respective partial component groups can be moved into the respectively provided position of use or travel position by means of an actuator component group comprising a hydraulic and/or motoric actuator.

A constructive optimization of the component connections that are embodied alternatively as a pivoting, folding and/or push construction in the area of the two lateral separation devices provides that they are each formed as a two-part system in the area of the angled or edge-parallel conveying sections. With these partial component groups that are interacting functionally in the working position with each other, a structure is provided with which handling upon movement into the position of non-use is improved by means of the weight that is adaptable to the actuating possibilities as well as by means of the divided size.

In accordance with the conveyed stream of the crop to be processed, the two separating devices each have a leading receiving pivot unit and a downstream unloading pivot unit as the two partial component groups of the conveying stretch.

This completion of the deflection conveying unit provides that the separating devices each receiving one of the partial streams are embodied in the area of the two-unit actuator component group with components that are arranged mirror-symmetrical to each other and, beginning at the longitudinal center plane, can be integrated optimally into the machine frame at the edges, respectively.

Advantageously, the receiving pivot unit of the respective separating device is provided with an outer frame section wherein the latter comprises at least a guide roller as well as a transfer belt. The thus constructed component group as a whole can be moved about a pivot axis which relative to the longitudinal machine center plane is parallel and is in particular horizontal. In this context, the receiving pivot unit in the area of the support frame comprising several frame sections is provided with a conveyor belt that is guided across pulleys. Also, it is conceivable that the receiving pivot unit in the area of the support frame comprises more than two frame sections and, in this way, an extendable system for the transport of the crop can be formed.

The frame sections of the receiving pivot unit movable in the area of the support frame are designed to be variable in regard to their support construction, wherein it is conceivable that, by pushing together, collapsing and/or folding, the respective width measure that is required for traveling on roads can be produced alternatively in the area of the separating devices or the respective support frame.

For optimal interaction of the supplied crop stream and the afore described separating devices, the latter, downstream of the receiving pivot unit, are provided with an adjoining downstream unloading pivot unit. This second partial component group of the respective separating device which is also individually movable is preferably provided with at least one receiving belt that is extending parallel to the longitudinal machine center plane and that receives the crop from the receiving pivot unit, wherein the receiving belt interacts with an transfer belt that is associated therewith with angular displacement toward the longitudinal machine center plane. In this context, the receiving belt is arranged such that the crop can be deflected from it at the unloading end to the transfer belt by means of at least one guide roller as a transverse conveyor.

The optimal pivot construction of this unloading pivot unit provides that the receiving belt and the transfer belt which is acting as a transverse conveyor are supported as a common movable component group in the machine frame. Also, it is conceivable to provide these component groups with separate actuators and to provide an individual movement in this way.

Based on the afore described system of the crop movement by means of the receiving and unloading pivot units, the deflection conveying unit provided therewith and substantially secured centrally in the upper area of the machine frame also interacts optimally with the component groups for admixture movement. In this context, substantially synchronous to the partial stream formation in the area of the crop stream, the usually provided movement of admixtures, haulm and similar residual materials is realized in the system. The conveyed material which is upwardly moved by means of a haulm belt is subsequently moved to the conveying run that is substantially ascending parallel to the crop stream along an upper horizontal partial section above the separating devices of the deflection conveying unit so that the haulm components and similar conveyed material reach a top zone of the machine. From this conveying position that can be used as an effective drop zone for the residual materials, the haulm belt is guided such that it is substantially forming a vertically downwardly extending deflected return run and a controllably adjustable movement of the residual materials is possible in this area.

When looking in total at this conveying situation that is immediately adjoining the lifting process, it is apparent that preferably a haulm belt and a screen belt which receives the crop are interacting as a double-layer cleaning structure at least in the ascending partial section of the conveying stretch. In this connection, the conveying concept is designed such that the haulm belt in the area of the ascending cleaning stretch is extending with parallel spacing above the crop stream of the screen belt to the upper drop zone.

Based on the action of the haulm belt which is guided into the upper drop zone, it is provided that its return run is guided such that it can extend at least over sections thereof through a drop space for the admixtures that is formed in particular in the area of the deflection conveying unit. In this context, this drop space can also be provided downstream of the two mirror-symmetrically arranged separating devices. In this way, it is apparent that the drop space interacting with the haulm belt defines a chute centrally arranged in the machine whose top-side circumferential rim is delimited by the component groups of the separating devices. The separating devices that form the deflection conveying unit can be arranged preferably upstream of the drop space in the conveying direction of the screen belt.

A constructive variant of the afore described machine concept provides that it can be provided also with more than two separating devices in the area of the deflection conveying unit.

The constructive configuration of the deflection conveying unit in the area of the two separating devices provides that here respective variable belt and/or screen constructions as moveable "lateral conveyors" can form the receiving pivot unit and the unloading pivot unit. From here, the respective partial stream of the crop can be moved angularly relative to, or opposite to, the travel direction and then, at the end, a conveyed stream is formed of both partial conveyed streams that is conveyed on the unloading conveyor to the collecting bunker.

The unloading conveyor in this context can be provided in particular with a reduced conveying width in comparison to the leading screen belt and, in the area of the "lateral conveyors", the rearward transverse conveyors acting in the direction toward the unloading conveyor, respectively, can also be provided as "sorting component groups" for separating rocks or clods from the crop.

The constructive adaptation of the afore described system to different machine configurations provides also the possibility that the deflection conveying unit, in place of the "mirror-symmetrical arrangement" of two separating devices each provided with receiving pivot unit and unloading pivot unit, can also be provided with only one separating and guiding component group that is acting only on one side relative to the longitudinal machine center plane.

BRIEF DESCRIPTION OF THE DRAWINGS

Further details and advantageous embodiments of the invention are illustrated in the drawing and will be explained in the following in more detail. The drawing shows in:

FIG. 1 a perspective overview of the root crop harvesting machine in the form of a potato harvester during use in the field;

FIG. 2 a plan view of the basic construction of the machine concept according to the invention with components of a central deflection conveying unit in working position;

FIG. 3 a plan view similar to FIG. 2 with the components in the area of the deflection conveying unit in the travel position of the machine for travel on roads;

FIG. 6 an enlarged detail view of a second component group of the separating device in the form of an unloading pivot unit which, in the area of a downstream sorting stretch, is arranged upstream of the transfer into a collecting bunker, FIG. 7 a basic illustration similar to FIG. 6 with the unloading pivot unit in folded travel position;

FIG. 13 a plan view of the conveying stretches of the machine provided with constructive details similar to FIG. 1;

FIG. 14 a side view of the respective conveyed streams of crop and admixtures in the machine concept according to FIG. 13;

FIG. 15 an enlarged detail illustration in the area of the ascending conveying run of the machine according to FIG. 14;

DESCRIPTION OF PREFERRED EMBODIMENTS

Figure 16:
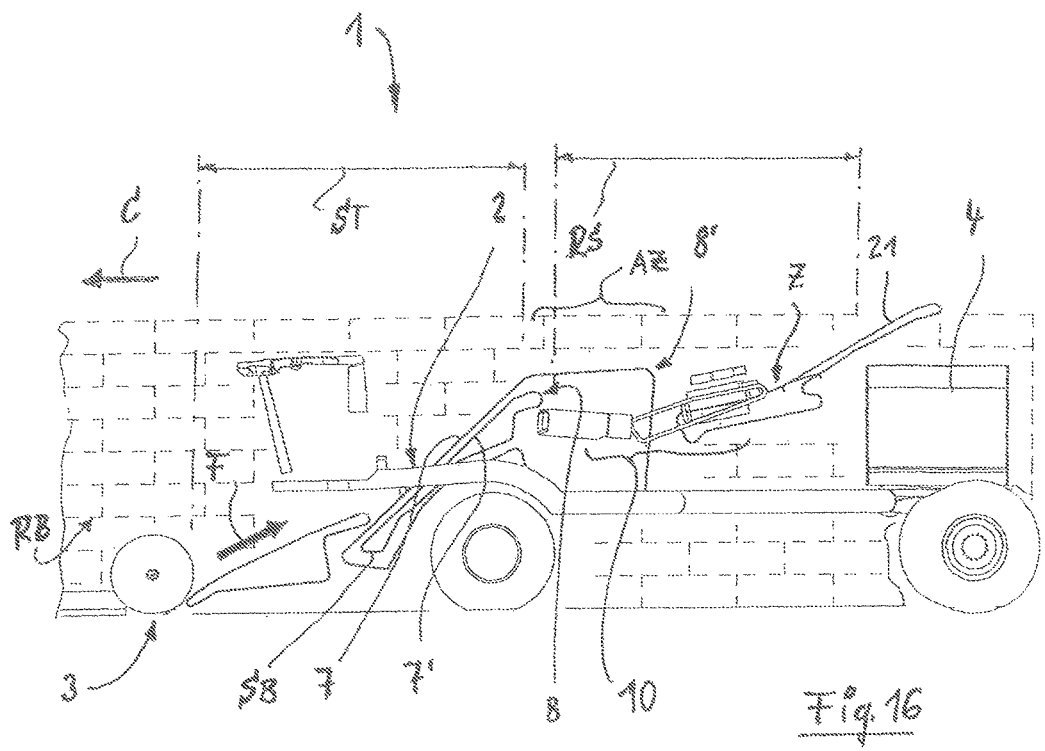
FIG. 16 a side view of the machine concept according to the invention with basic illustration of the conveying paths in the area of the machine frame with driver's cabin and collecting bunker.

In FIG. 1 and FIG. 16 in respective basic illustrations the important components of a root crop harvesting machine 1 are illustrated. In this context, when looking also at FIG. 13 to FIG. 15, a principal action and sorting sequence of this "self-propelled" machine 1 in particular when harvesting root crop K from four rows R or potato ridges is apparent. Conceivable is also that the machine 1 to be described in the following in more detail is embodied in the form of a pull-behind potato harvester or stationary cleaning device so that the drive components, not shown in detail in FIG. 1 or FIG. 16, such as motors, driver's cabin, and/or collecting bunker are not needed.

Figure 17:
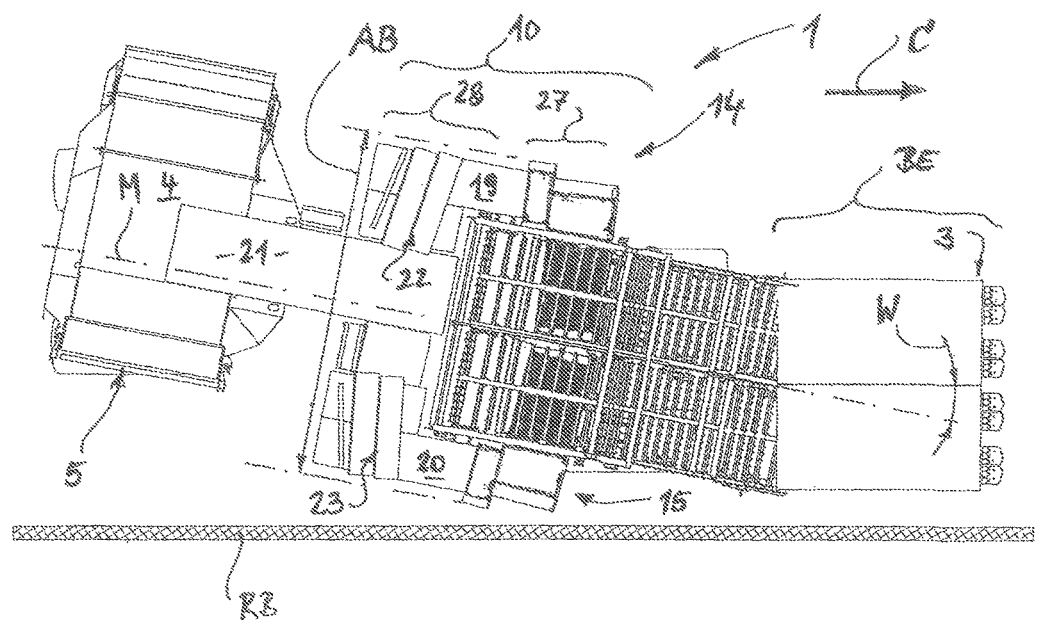
FIG. 17 a plan view of the machine according to FIG. 1 or FIG. 16 in a working position with component groups in the area downstream of the lifting elements pivoted into crab steering position.

Such machines 1 have in the leading area of a machine frame 2 (FIG. 16) a lifting device 3. This lifting device 3 has correlated therewith, in conveying direction F downstream thereof, an ascending first sorting stretch ST that is provided with a substantially unchangeable processing width B (FIG. 1). When looking at FIG. 1 and FIG. 13 to FIG. 15, it is apparent in regard to function that in the area of this first sorting stretch ST the admixtures T in the form of haulm (arrow FT) can be separated from the crop FK that is comprised preferably of tubers K, K' (together with conveyed residual material, not illustrated in detail). For this first separating phase, different systems are known. In the illustrated embodiment according to FIG. 14 in combination with FIG. 16 and FIG. 17, the embodiment of a leading component group BE is apparent which in the illustrated machine 1 can also be pivoted, in relation to the longitudinal machine center plane M, about an angle W such that the system can be moved in "crab steering position" along respective boundaries RB in the travel direction C (FIG. 17).

This travel position of the root crop harvesting machine 1 can be advantageous when projecting parts of the system project past the width B which corresponds to its travel width (here working width according to AB; FIG. 2) or when the machine is to travel close to the boundary RB in the crop lifting mode.

It is known that for such harvesting machines 1 the crop, in the form of the tubers K as conveyed material, is conveyed at least across the sorting stretch that is identified as a whole by ST (FIG. 16) as well as a cleaning stretch RS' (FIG. 1) to a collecting bunker 4 or directly to an unloading elevator 5', wherein intermediate sorting and cleaning processes occur and the collected tubers K' are moved away by means of a transporter TP.

In this context, it is also known that at least one conveying run 7, 7' which is movable along the partially ascending sorting stretch ST is guided up to a top drop zone AZ (FIG. 16) in the area of the haulm conveyor FT or the tuber conveyor FK. Subsequently, the respective conveyed material K (tubers) or the conveyed material T (admixtures) can be transferred or discharged onto a downstream conveying stretch.

Based on these generally known machine concepts with substantially "linear conveying, cleaning and sorting unit", the improved concept according to the invention provides that the respective conveying run 7 or 7' in the area of the first sorting stretch ST of the machine 1, near a respective upper unloading end 8, 8', interacts immediately with at least one multi-functionally configurable deflection conveying unit 10, 10' (FIG. 2, FIG. 13).

This deflection conveying unit 10, 10' (FIG. 11, FIG. 12) is designed such that at least the conveyed material stream FK of the crop K can be received and can be transferred to a sorting and cleaning process that is usually provided downstream. In this context, the tubers K along a sufficiently long "movement path" are loosened, individualized, soil particles are removed from them, and they are separated from residual material and conveyed farther. In this context, sorting out rocks, clods and similar solid materials is possible by hand or by machine so that a cleaned tuber stream reaches the bunker 4.

When looking at the illustrations in FIG. 9 to FIG. 12, it is apparent that the deflecting conveying unit 10, 10' which realizes this sorting process and is constructed as a compact structure of generally known components forms at least one partial conveyed stream 12, 12', 13 that is substantially movable transverse to the feed direction FT, FK of the respective conveying run 7, 7'. Accordingly, the conveyed stream is thus supplied along a variably determinable movement path to the area of at least one rearward unloading conveyor 11 and is thus transferred to the bunker 4 or the unloading elevator 5.

Based on a targeted controllable "deflection" of the crop stream FK in the area of the deflection conveying unit 10, a device arrangement is provided that is functionally improved in comparison to the known machines and that is provided with partial areas that are advantageously extending "transversely" within the machine 1. This integration of at least one upper deflection conveying unit 10, 10' into the machine system 1 is designed such that now, for substantially identical length dimensions of such machines, at least one separating device 14, 15, 15', respectively, can be combined in variable installation positions and positions of use with the components of the upstream sorting stretch ST.

This integration of the at least one separating device 14, 15, 15' into the area of the deflection conveying unit 10, 10' provides the possibility to define in the working position (FIG. 1, FIG. 13) on the field an operating position which projects past the receiving width B of the machine 1 with a projecting width AB by using for the first time moveable separating devices 14, 15. From this working position, which can be optimized by appropriate component configurations in the area of the deflection conveying unit 10, 10', the at least one separating device 14, 15 can be returned into a travel position (FIG. 3, width B) suitable for traveling on roads.

In this way, based on the generally known concepts for adaptation of agricultural machines to travel on roads, with surprisingly simple means the possibility is provided to change only insignificantly a four-row harvesting machine 1 in its length dimensions L (FIG. 12) while at the same time an optimal processing of an enlarged crop volume is ensured and requirements in regard to unlimited utility for travel on roads, even in case of self-propelled devices, are fulfilled with comparatively minimal expenditure.

It is understood that the lifting device 3 which is upstream of the sorting stretch ST is provided with a configuration of a maximum receiving width B (FIG. 2) that is matched substantially to the width required for road travel of the machine 1. Conceivable in this context is also that by width variation in this lifting area of the machine 1 the respective number of potato rows R to be lifted can be designed to be variable and by "foldable" lifting component groups the number of rows R to be lifted is varied.

Figure 11:
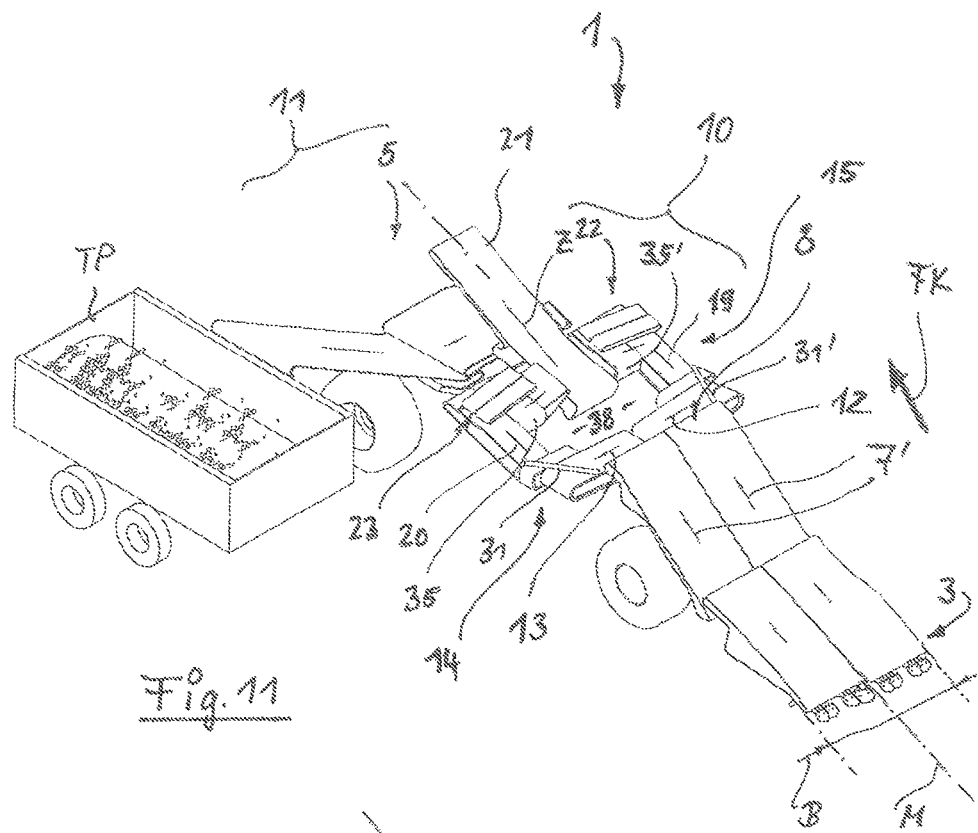
FIG. 11 a perspective illustration of the conveying principle according to FIG. 9 with the machine in working position.
Figure 12:
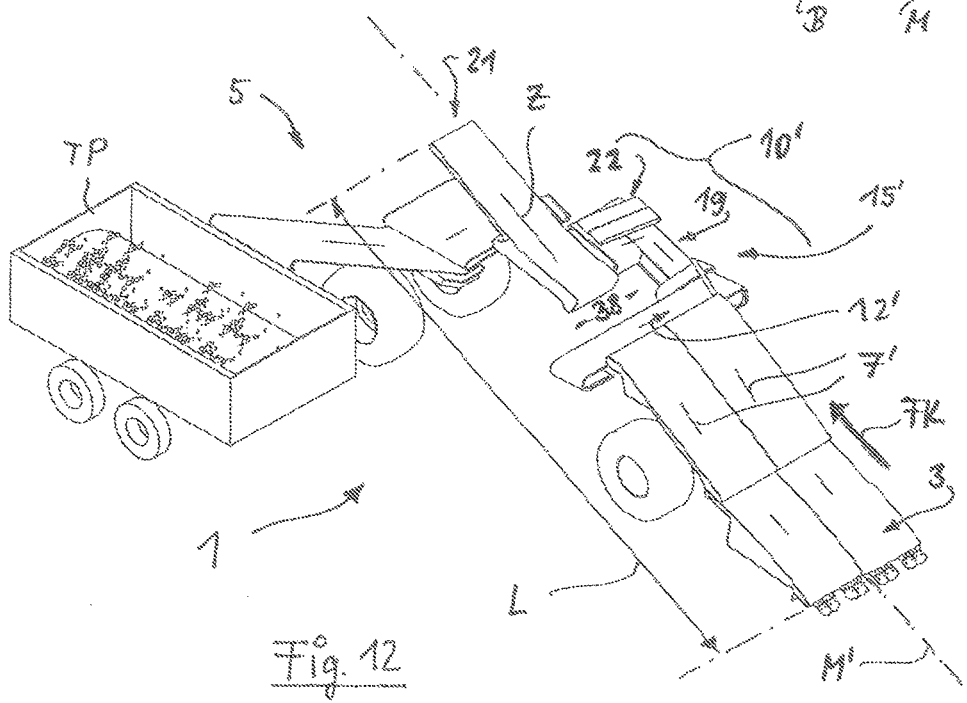
FIG. 12 a basic illustration of the conveying system according to FIG. 10 with only one separating device.

As already apparent in the illustrations of FIG. 2 to FIG. 8, in the area of the deflection conveying unit 10 the system advantageously has two separating devices 14, 15 that are mirror-symmetrically arranged relative to the longitudinal machine center plane M and by means of which the crop K, which has been pre-cleaned on the sorting stretch ST and is supplied in a wide swath by at least one screen belt SB (FIG. 15), can be optimally received in the area of the deflection conveying unit 10, 10'. From the functional illustrations in FIG. 14 to FIG. 16 it is apparent that the partial conveyed stream FK of the crop K is moved, optimally separated from the admixtures T (arrow FT) that are located within the drop zone AZ, on the respective lateral partial conveying stretches 12, 13 (FIG. 11).

In an optimal orientation of the component groups it is provided that the two moveable separating devices 14, 15 of the deflection conveying unit 10 each form the outwardly oriented partial conveying stretches 12, 13 which are oriented substantially opposite to each other relative to the longitudinal center plane M. From here, the tubers K, K' forming the crop are guided across sorting stretches 19, 20, 22, 23 oriented toward an unloading elevator 5 provided as an unloading device 11 wherein preferably a combined stream Z of the formed crop streams in the area of a rearward central conveying belt 21 is realized (FIG. 11).

Figure 4:
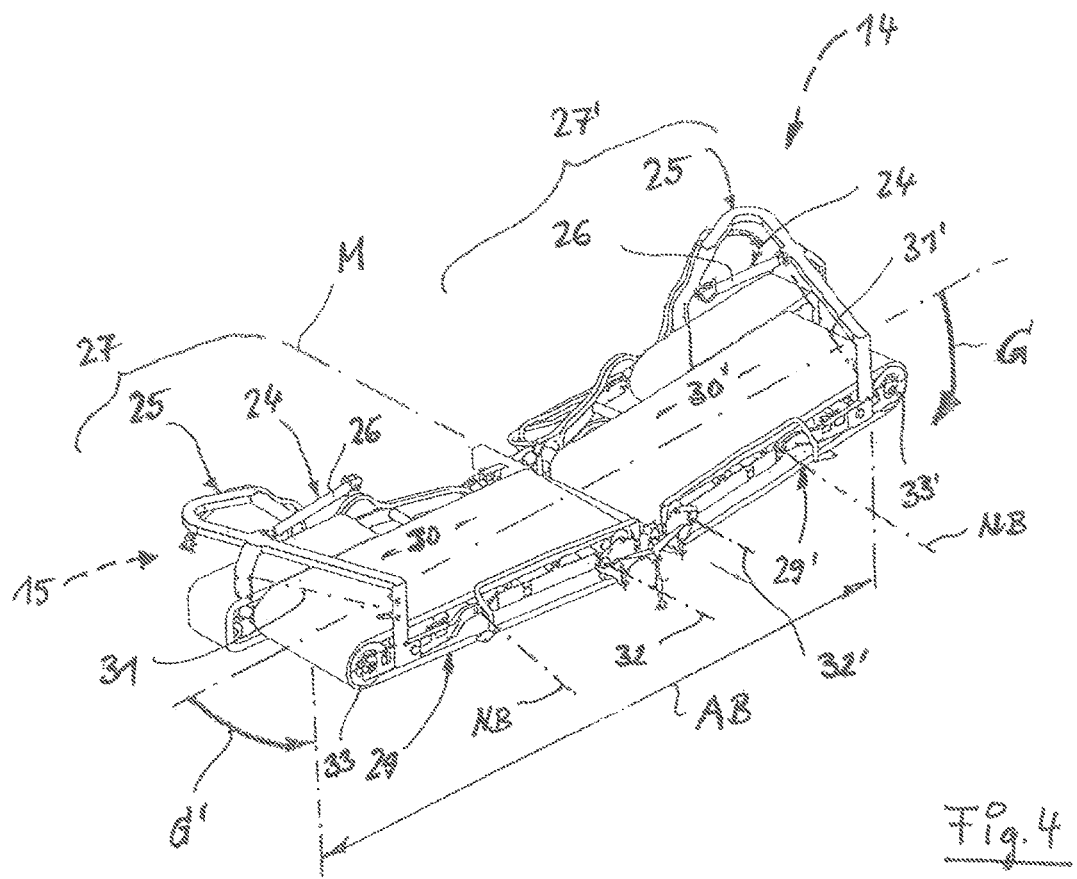
FIG. 4 an enlarged detail view of a separating component group, which receives the conveyed material in the area of the deflection conveying unit and is acting as a receiving pivot unit, in a working position.
Figure 5:
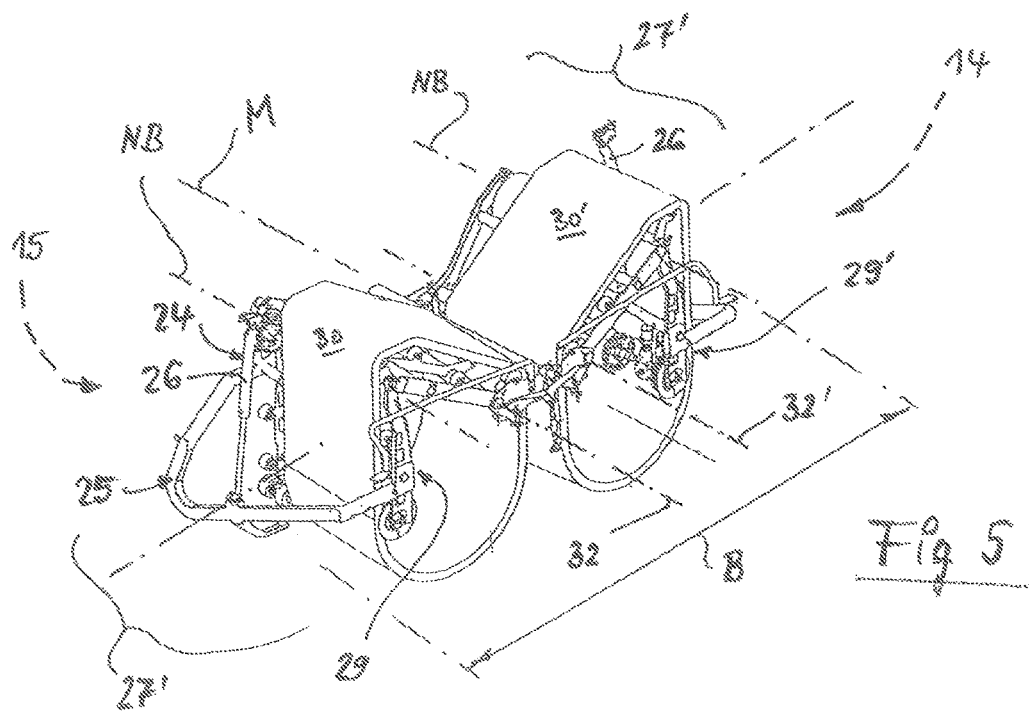
FIG. 5 the receiving pivot unit according to FIG. 4 in pivoted travel position.
Figure 8:
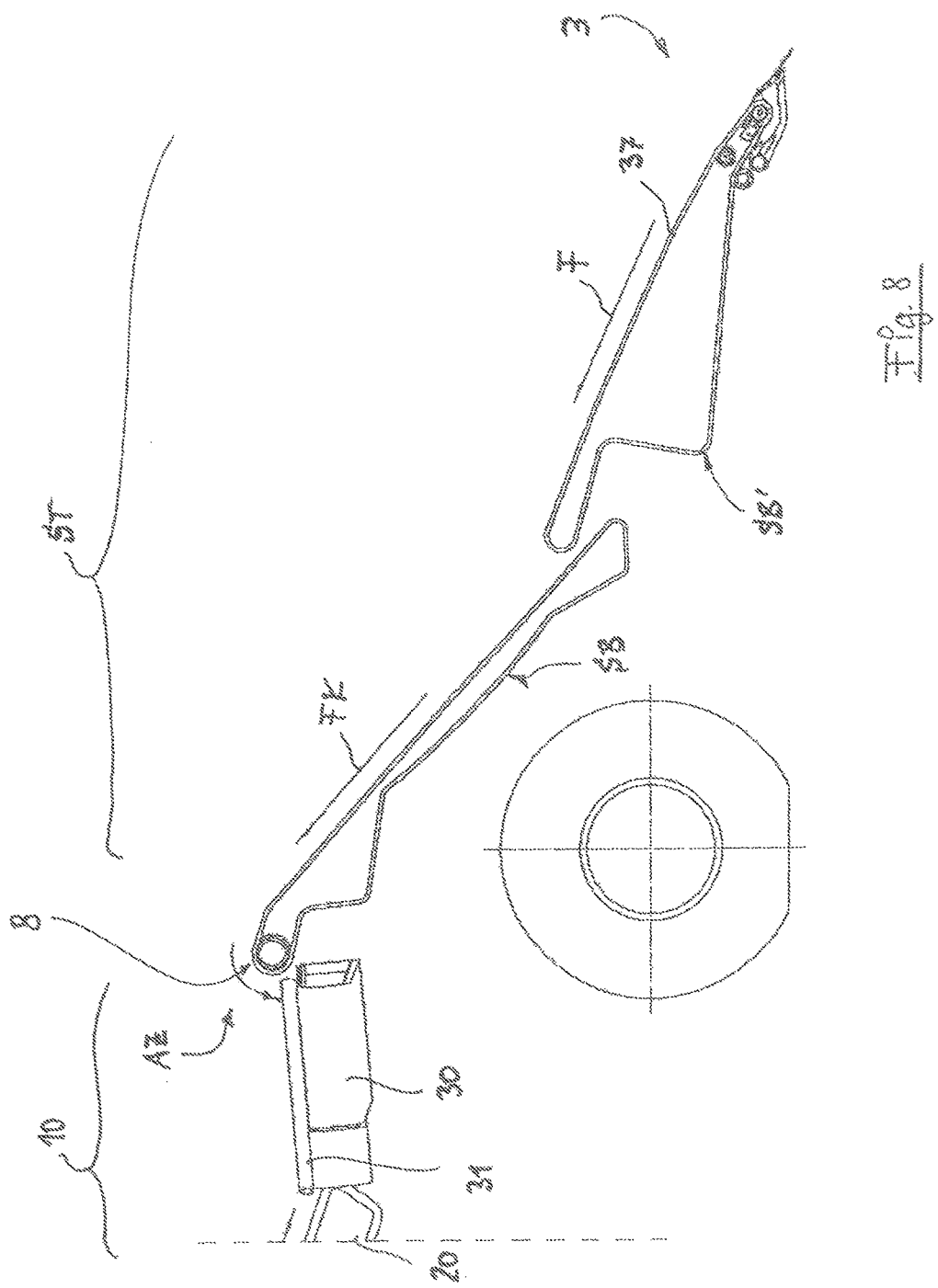
FIG. 8 a schematic illustration of respective conveying stretches of the system in a side view.
Figure 9:
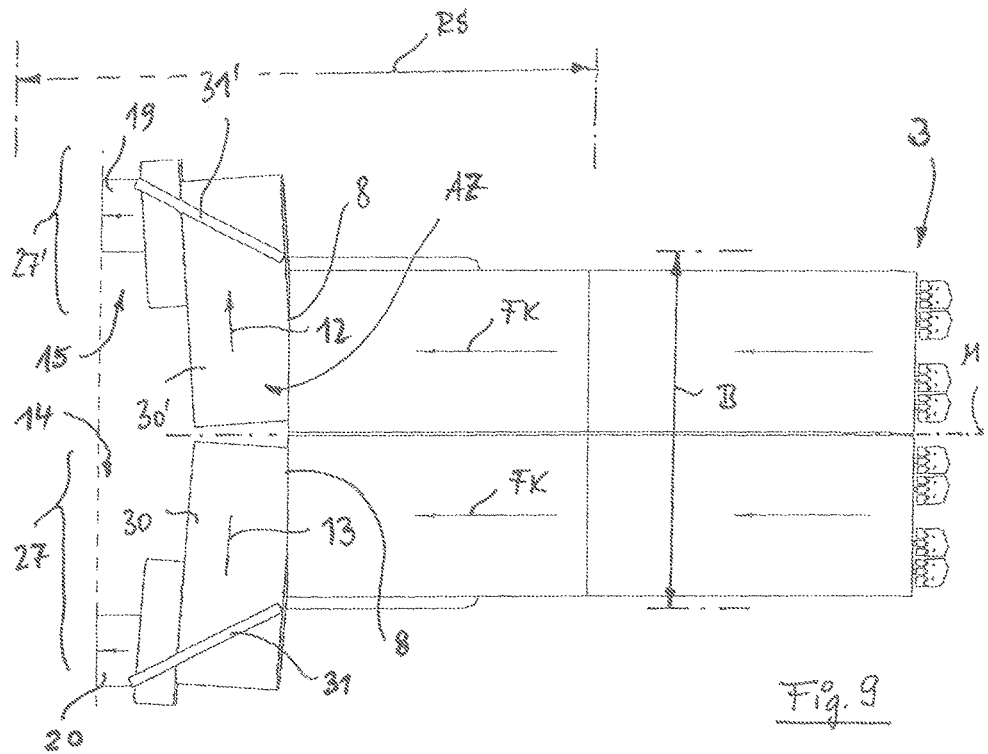
FIG. 9 a plan view of the conveying principle for the crop stream to the area of the deflection conveying unit with two separating devices.
Figure 10:
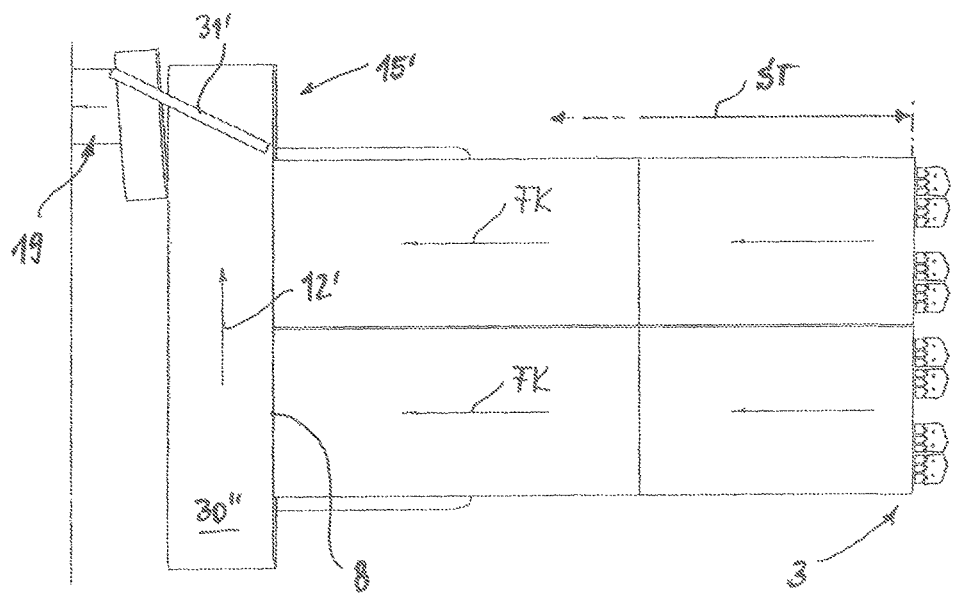
FIG. 10 a plan view similar to FIG. 9 with only one of the separating devices in the area of the deflection conveying unit.

When looking at the illustrations of FIG. 2 to FIG. 7, the constructive details in the area of the "twin" deflection conveying unit 10 in respective operating positions are apparent. Beginning at the longitudinal machine center plane M 1, the mirror-symmetrically arranged component structure (which extends in the area of the machine frame 2, not shown in detail here) is apparent. The respective separating devices 14, 15 that receive one of the partial streams, respectively, are supported in the area of the two partial conveying stretches 12, 13 such that respective movements, illustrated in FIG. 6 with arrow E or E', can be performed as preferred movement directions. An appropriate "folding movement" is illustrated in FIG. 4 and FIG. 5 by arrows G, G' so that the principal actuating movements into the respective position of the separating devices 14, 15 can be understood.

For this preferred pivot movement, in the direction E, E' or G, G', at least the respective partial components groups of the edge-side separating devices 14, 15 of the deflection conveyor unit 10, 10' are supported movably by means of an actuator component group 25, 25' that is provided with at least one hydraulic or electro-motoric actuator 24, 24'. The actuators 24, 24' are preferably provided with respective hydraulic cylinders 26, 26'.

When looking at the respective deflecting conveyor 10 in FIG. 2 and FIG. 3 and the detail illustrations in FIG. 4 to FIG. 7, it is apparent that the separating devices 14, 15 in a preferred embodiment are formed as a two-part system, respectively. In the illustrations according to FIG. 4 and FIG. 5, the configuration of a respective leading receiving pivot unit 27, 27' as an independent component group is shown in different operating positions in an exemplary fashion. This receiving pivot unit 27, 27' interacts respectively with an unloading pivot unit identified as a whole by 28, 28' as a second independent component group; its constructive configuration can be seen in particular in FIG. 6 and FIG. 7.

Based on the basic functional descriptions of the system and its basic illustrations according to FIG. 8 to FIG. 12, it is apparent that the receiving pivot unit 27 is to be combined with appropriate guiding component groups in order to realize the directed further conveyance of the tubers K, K' to corresponding partial conveying stretches 12, 13. At the same time, the construction is to be optimized such that, with comparatively minimal expenditure, the desired width B for positioning in the travel position is achieved (FIG. 5) upon pivot movement (at least G, G'). In this context, it is provided that the receiving pivot units 27, 27' in symmetric arrangement are to be provided with at least one outer frame section 29, 29'. In this context, the conveyed material by means of a transfer belt 30, 30' and a guide roller 31, 31' can be supplied to the downstream sorting stretches 19 or 20 illustrated in FIGS. 9 to 12. When looking at FIG. 4 and FIG. 5, it is apparent that these receiving pivot units 27, 27' at least in the area of the frame sections 29, 29' can be moved (arrow G, G') about a pivot axis 32, 32' which is parallel to the longitudinal machine center plane M 1 and is horizontally oriented.

The constructive embodiment of the receiving pivot unit 27 can also provide that with several of the frame sections 29, 29' a variably extendable support frame can be formed with which the transfer belt 30, 30' is interacting that is guided across respective pulleys 33, 33' and is embodied as a conveyor belt, screen belt or the like. In the illustrated embodiment (FIG. 4, FIG. 5) the receiving pivot unit 27, 27' is provided, in an optimal configuration of the support frame, with two "divided" frame sections 29, 29' so that the "bent" position illustrated in FIG. 5 is possible by at least actuating the hydraulic cylinders 26. In this way, it is clear that the respective lateral frame parts by means of actuator members that are not illustrated in detail can also be pivoted about an axis NB.

From these overview illustrations in FIG. 4 and FIG. 5 it is apparent that, in the area of the receiving pivot units 27, 27', the provided "movement system" with components that are controllable in a simple way can be formed by means of an optimal construction of the support frame or of the respective frame sections 29, 29'. In this context, it can also be provided that by variable component groups pushing together, collapsing and/or folding of the receiving pivot units 27, 27' is possible and the width dimension B that is required for traveling on roads is achieved in any case.

When looking at the respective adjusting positions of the component groups according to FIG. 2 and FIG. 3, looking also at the individual illustrations in FIG. 6 and FIG. 7, the configuration of the respective separating device 14, 15 in the area of the unloading pivot units 28, 28' with actuator component groups 18, 18' is clearly apparent.

In this way, it is in principle made clear that the receiving pivot units 27, 27' each can be formed also as a modular component group which, in the area of its actuator component groups 25, 25', can be moved independent of the downstream unloading pivot units 28, 28'. These structural adaptations can be designed such that the separating devices 14, 15 as a whole are provided with independently movable pivot units 27, 27' and 28, 28' in such a way that control and actuator component groups that can be competently adapted enable variable configurations of the machine 1 according to the invention with deflection conveying units 10, 10'.

The mirror-symmetrically arranged unloading pivot units 28, 28', as is apparent when looking at the illustration according to FIG. 11 in combination with FIG. 6 and FIG. 7, are provided with receiving belts 34, 34' that are extending each at a spacing AM (FIG. 2) to the longitudinal center plane M so that the crop K, K' can be moved opposite to the travel direction C of the machine 1 to the rear. A transfer belt 35, 35' is associated with the rearward end of the receiving belt 34, 34' and is crossed by a finger web BF or a similar transverse conveyor. From this transfer belt, in a conveying direction which is extending perpendicular to the longitudinal machine center plane M (according to sorting stretch 22, 23; FIG. 11), the crop K, K' is deflected onto the unloading conveyor 21. In this way, the conveyed streams of the deflection conveying unit 10 that up to this point were "divided" are again combined in the area of the unloading conveyor 21 and this conveyed stream is then transferred into the bunker 4 or an unloading elevator 5 (FIG. 1, FIG. 14).

In a generally known constructive configuration of the receiving belt 34, 34', it is provided that the latter may be provided at the unloading end with a guide roller LW (downstream of the transverse conveyor BF) that guides the respective partial stream. Preferably, a configuration in the form of the finger web BF is used because in this way a system is obtained that is suitable for sorting tubers K and rock or clod components. By means of the flexible finger structures of the transverse conveyor BF resting on the transfer belt 34, 34', and a conceivable intermediate belt ZB, the tubers K are transported farther and the comparatively heavy clods and rocks can be discharged in the area of a sorting site PS (FIG. 13).

From the afore described constructive configuration of the rearward unloading pivot unit 28, 28', it is apparent that in particular the receiving belt 34 and the transfer belt 35 that is acting as a transverse conveyor form the independent commonly moveable unit. It can be pivoted independent of the upstream receiving pivot unit 27, 27' comprising only two transverse conveyors 30, 30'.

This makes clear at the same time that the illustrated "folding system" according to the invention can require different movement spaces in different configurations within the overall concept of the machine 1. This results in further combination possibilities of the component groups which are considered to be disclosed in the context of the invention. These variable component combinations can result in particular from the respective variable dimensions of the component widths in the area of the screen belt SB or the unloading conveyor 21. Also, it is conceivable to combine the generally illustrated pivot adjustments according to arrow E, E' and G, G' for the respective actuator component groups 25, 25' (FIG. 4, FIG. 5) and 18, 18' (FIG. 6, FIG. 7) with further pivot and/or push components (arrows P, P'; FIG. 6, FIG. 7) so that, in relation to the space conditions, optimally adjustable stowed positions of the system components in the machine 1 can be achieved.

The machine configuration according to the invention with the components of a "movable" deflection conveying unit 10, 10' provides also an improvement of the configuration, already addressed in connection with the illustrations of FIG. 13 to FIG. 15, in the area of the admixture conveyance FT. Based on the concept that in principle also a lateral deflection (in deviation from the conveying direction FT) is conceivable, as indicated in the plan view (FIG. 13) by arrow SU, the conveyance FT in the area of the machine 1 provides for a preferred "upward conveyance" (FIG. 14).

The admixtures (conveyance FT) upwardly conveyed into the area of the deflection conveying unit 10, 10' by means of the haulm belt 36 are moved, downstream of the ascending conveying run of the sorting stretch ST, along a substantially horizontal partial section (FIG. 14, zone AZ) at least partially above the separating devices 14, 15 of the deflection conveying unit 10, 10'. Downstream thereof, the haulm belt 36 forms a substantially vertically downwardly deflected return run 36'. FIG. 13 and FIG. 14 illustrate at the same time a belt combination of haulm belt 36 and screen belt SB wherein this generally known two-belt variant is extending as a double-layer cleaning structure only across the area of the first sorting stretch ST.

When looking at FIG. 17, it is apparent that this double-layer cleaning structure is combined with the upstream component BE; in its area there is also a screen conveyor 37 provided. The illustration according to FIG. 15 shows the optimal separation step of the admixtures T and the tubers K of the crop in the area of the double layer cleaning structure wherein the haulm belt 36 preferably extends at a parallel spacing to the screen belt SB that forms the crop stream.

Based on this generally known conveying system now oriented toward the deflection conveying unit 10, 10', a further optimization and adaptation is required in its area. In an expedient embodiment, the return run 36' of the haulm belt 36 can be guided such that the latter at least over sections thereof penetrates through a drop space 38 that is formed by the deflection conveying unit 10, 10'. From the respective total views and basic illustrations of the system it is apparent that the drop space 38 interacting with the haulm belt 36 defines a chute area centrally arranged in the machine 1. In this context, the drop space 38 is expediently delimited at the circumferential rim at the topside by the component groups of the separating devices 14, 15. It is also conceivable that a main frame 39 receiving the screen and haulm belt system (FIG. 1) is provided with an appropriate guide plate 40; in this way, an efficient chute boundary enables the targeted discharge of the admixtures T (FIG. 14).

The specification incorporates by reference the entire disclosure of German priority document 10 2014 015 835.7 having a filing date of Oct. 28, 2014.

While specific embodiments of the invention have been shown and described in detail to illustrate the inventive principles, it will be understood that the invention may be embodied otherwise without departing from such principles.

What is claimed is:
1. A root crop harvesting machine comprising:
a machine frame (2);

a lifting device (3) arranged in a leading area of the machine frame (2);

an ascending sorting stretch (ST) arranged downstream of the lifting device (3) in a conveying direction (F) of conveyed material, wherein the ascending sorting stretch has a working width (B);

wherein the ascending sorting stretch (ST) comprises at least one conveying run (7, 7') comprising an upper unloading end (8, 9) and being movable along a length of the ascending sorting stretch (ST) to the upper unloading end, wherein the at least one conveying run comprises a double layer cleaning structure comprising a haulm belt and a screen belt, wherein admixtures are at least partially separated from the conveyed material by the double layer cleaning structure as the conveyed material passes across the ascending sorting stretch in the conveying direction (F);

at least one deflection conveying unit (10, 10') arranged downstream of the upper unloading end of the at least one conveying run (7, 7') to receive the conveyed material from which the admixtures have been at least partially separated while the separated admixtures bypass the at least one deflection conveying unit;

wherein the at least one deflection conveying unit (10, 10') comprises at least one separating device (14, 15, 15') that comprises a travel position in which the root crop harvesting machine has a travel width required for traveling on roads, wherein the at least one deflection conveying unit (10, 10') is configured to move from the travel position into a position of lateral projecting width (AB) so as to project at least on one side of the root crop harvesting machine past the working width (B) and to be returned into the travel position, as needed;

wherein the at least one deflection conveying unit (10, 10') forms at least one partial conveyed stream (12, 12', 13) of the conveyed material received from the at least one conveying run (7, 7'), wherein the at least one partial conveying stream is moving transverse to a feed direction (FT, FK) of the at least one conveying run (7, 7');

at least one unloading conveyor (21), wherein the at least one partial conveyed stream (12, 12', 13) is moved onto the at least one unloading conveyor (21) so as to be transferred to a collecting bunker (4) or an unloading elevator (5).

2. The root crop harvesting machine according to claim 1, wherein the lifting device (3) comprises a receiving width (B) corresponding substantially to the working width (B).

3. The root crop harvesting machine according to claim 1, wherein the screen belt (SB) is acting on the conveyed material to separate root crop and admixtures from each other and generate a pre-cleaned root crop stream that is supplied in a wide swath by the screen belt onto the at least one deflection conveying unit (10, 10') comprising two separating devices (14, 15) that each form a partial conveying stretch, respectively.

4. The root crop harvesting machine according to claim 1, wherein the at least one partial conveyed stream is a root crop stream and wherein the admixtures separated from the root crop stream are moved into a drop zone of the at least one conveying run (7, 7').

5. The root crop harvesting machine according to claim 1, wherein the at least one deflection conveying unit (10) comprises two separating devices (14, 15) each forming a partial conveying stretch oriented in opposite and outward direction relative to each other and relative to a longitudinal machine center plane, wherein the root crop harvesting machine further comprises sorting stretches interacting with the two separating devices (14, 15), the sorting stretches each extending toward the collecting bunker (4) or the unloading elevator (5) and configured to be oriented longitudinally (19, 20) and transversely (22, 23) relative to the longitudinal machine center plane.

6. The root crop harvesting machine according to claim 1, wherein the at least one deflection conveying unit (10) comprises two separating devices (14, 15) each forming a partial conveying stretch receiving one of the partial conveying streams, wherein the two separating devices (14, 15) are mirror-symmetrically arranged on the machine frame (2) relative to a longitudinal center plane of the ascending sorting stretch.

7. The root crop harvesting machine according to claim 6, wherein at least partial component groups of the two separating devices (14, 15) are movable by an actuator component group (25, 25') comprising at least one hydraulic actuator or at least one electro-motoric actuator (24, 24').

8. The root crop harvesting machine according to claim 6, wherein the two separating devices (14, 15) each form a two-part system comprising a leading receiving pivot unit (27, 27') and a downstream unloading pivot unit (28, 28').

9. The root crop harvesting machine according to claim 8, wherein the receiving pivot unit (27, 27') and the unloading pivot unit (28, 28') at least sectionwise comprise independently movable components.

10. The root crop harvesting machine according to claim 8, wherein the receiving pivot unit and the unloading pivot unit (27, 27'; 28, 28') each form a modular component group each secured at the actuator component group (25, 25'; 18, 18') so as to be independently movable (arrow E, E'; G, G').

11. The root crop harvesting machine according to claim 8, wherein the receiving pivot unit (27, 27') comprises an outer frame section (29, 29'), at least one guide roller (31, 31'), and a transfer belt (30, 30'), wherein the receiving pivot unit (27, 27') is movable at least about a pivot axis (32, 32') that is arranged parallel to a longitudinal machine center plane (M) of the root crop harvesting machine and that can be horizontally aligned.

12. The root crop harvesting machine according to claim 11, wherein the receiving pivot unit (27, 27') comprises a support frame comprising several frame sections (29, 29') and further comprises a conveyor belt guided about pulleys (33, 33') connected to the support frame.

13. The root crop harvesting machine according to claim 11, wherein the receiving pivot unit (27, 27') comprises several frame sections.

14. The root crop harvesting machine according to claim 11, wherein the receiving pivot unit (27, 27') comprises movable frame sections (29, 29') configured such that, by pushing together, collapsing and/or folding the moveable frame sections, the travel width required for traveling on roads can be generated.

15. The root crop harvesting machine according to claim 8, wherein the two separating devices each comprise in the area of the unloading pivot unit (28, 28') at least one receiving belt (34, 34') extending parallel to the longitudinal machine center plane (M) and a transfer belt (35, 35') associated with the at least one receiving belt (34, 34') and embodied as a finger web (FB), wherein the at least one receiving belt (34, 34') and the transfer belt (35, 35') are arranged such that the root crop stream (K, K') conveyed thereon is deflected in a direction of the unloading conveyor (21).

16. The root crop harvesting machine according to claim 15, wherein the at least one receiving belt (34, 34') comprises an unloading end provided with a guide roller (LW, LW') acting as a transverse conveyor so as to deflect the root crop stream to the transfer belt.

17. The root crop harvesting machine according to claim 15, wherein the unloading conveyor (21) comprises a smaller conveying width than the screen belt (SB) of the ascending sorting stretch.

18. The root crop harvesting machine according to claim 15, wherein the at least one receiving belt (34, 34') and the transfer belt (35, 35') and an intermediate belt (Z) parallel to the at least one receiving belt (34, 34') together form the unloading pivot unit (28, 28').

19. The root crop harvesting machine according to claim 1, wherein the haulm belt comprises:
- an ascending belt stretch moving the admixtures upwardly;
- a horizontal partial section adjoining the ascending belt stretch and extending above the at least one deflection conveying unit; and
- a substantially vertically downwardly deflected return run downstream of the horizontal partial section.

20. The root crop harvesting machine according to claim 19, wherein the haulm belt (36) extends, at least in the area of the ascending belt stretch, at a spacing parallel to the screen belt (SB).

21. The root crop harvesting machine according to claim 19, wherein the at least one deflection conveying unit (10, 10') forms a drop space (38) for the admixtures and wherein the return run (36') of the haulm belt (36) extends at least sectionwise through the drop space (38).

22. The root crop harvesting machine according to claim 21, wherein the drop space (38) and the haulm belt (36) define a chute area centrally arranged within the root crop harvesting machine (1), wherein a topside circumferential rim of the drop space is delimited by component groups of the at least one deflection conveying unit (10, 10').

23. The root crop harvesting machine according to claim 21, wherein the drop space (38) is arranged downstream of the at least one deflection conveying unit (10, 10').

24. The root crop harvesting machine according to claim 1, wherein in the area of the at least one deflection conveying unit (10) two or more separating devices (14, 15) are provided.

25. The root crop harvesting machine according to claim 1, wherein the at least one deflection conveying unit (10) is provided with component groups that are active on one side of the root crop harvesting machine relative to a longitudinal machine center plane (M').

\* \* \* \* \*